United States Patent [19]

Eaton et al.

[11] 4,401,298

[45] Aug. 30, 1983

[54] FLEXIBLE COLUMN VISCOUS SPRING DAMPER

[75] Inventors: Gerald E. Eaton, Wakeman; Emile M. Shtarkman, Norwalk, both of Ohio

[73] Assignee: Imperial Clevite Inc., Rolling Meadows, Ill.

[21] Appl. No.: 437,900

[22] Filed: Nov. 1, 1982

Related U.S. Application Data

[63] Continuation of Ser. No. 208,013, Nov. 18, 1980, abandoned.

[51] Int. Cl.³ .................... F16F 1/54; F16F 3/08
[52] U.S. Cl. .................... 267/140.1; 248/562;
 248/634; 267/35; 267/63 A; 267/141.1;
 267/141.3; 267/141.6; 267/141.7; 280/697
[58] Field of Search ............... 188/298; 267/35, 140.1,
 267/141.1, 141.6, 141.7, 152, 64.25, 63 A, 113,
 141, 141.2, 141.3, 141.4, 141.5; 248/562, 634;
 280/697; 244/104 FP

[56] References Cited

U.S. PATENT DOCUMENTS

| Re. 24,654 | 6/1959 | Sheets | 267/35 |
|---|---|---|---|
| 1,884,477 | 10/1932 | Wood | 267/35 |
| 2,503,378 | 4/1950 | Cornwell | 267/64.25 |
| 2,600,090 | 6/1952 | Barber et al. | 267/140.1 |
| 2,678,797 | 5/1954 | Roy | 267/141 X |
| 3,656,632 | 4/1972 | Karakashian et al. | 267/64.25 X |
| 3,658,314 | 4/1972 | Luzsicza | 267/35 X |
| 3,993,295 | 11/1976 | Suzuki et al. | 267/152 |
| 4,032,126 | 6/1977 | Laughlin et al. | 188/298 X |
| 4,161,304 | 7/1979 | Brenner et al. | 267/35 X |
| 4,234,172 | 11/1980 | Takahashi | 267/8 R |

FOREIGN PATENT DOCUMENTS

| 2639452 | 3/1978 | Fed. Rep. of Germany | 267/35 |
|---|---|---|---|
| 535096 | 3/1941 | United Kingdom | 267/63 A |

*Primary Examiner*—George E. A. Halvosa
*Attorney, Agent, or Firm*—Russell E. Baumann

[57] ABSTRACT

A viscous spring damper for damping and levelling structural agitation comprising a first outer member joined to a connecting member by a first elastomeric shear spring, the first outer member including a first fluid chamber and a first elastomeric diaphragm. A second outer member is joined to the connecting member by a second elastomeric shear spring and includes a second fluid chamber and a second elastomeric diaphragm. The connecting member is comprised of a plurality of elastomeric flexible sections which are disposed to form a main fluid chamber communicating with the first fluid chamber and the second fluid chamber, and further includes restrictive orifice for restricting the flow of fluid in the main fluid chamber.

6 Claims, 6 Drawing Figures

FLEXIBLE COLUMN VISCOUS SPRING DAMPER

This application is a continuation of application Ser. No. 208,013, filed Nov. 18, 1980, now abandoned.

BACKGROUND OF THE INVENTION

The present invention relates generally to shock absorbing suspension devices. More particularly, it relates to shock absorbing devices of the type which are typically mounted to vehicles and which use both an elastomeric shear spring and flow of fluid through a restricted orifice for absorbing shock, structural leveling and energy dissipation. Known shock absorbers of the type described include those disclosed in commonly assigned co-pending U.S. patent application Ser. No. 950,949, filed Oct. 13, 1978 now abandoned, with a continuation application Ser. No. 214,771, filed Dec. 9, 1980, in the name of L. Dale Coad.

In the Coad application an expandible and contractible elastomeric bladder for separating a gas chamber from a fluid chamber in a viscous spring damper was provided for varying the spring rate of the damper, calibrating the damper or leveling a load supported thereby.

Dynamic operating characteristics of such dampers are chiefly limited to spring rate, damping response, cyclical active energy consumption and the dissipation percentage thereof. Prior art devices of the type described have suffered from the problems of variable spring rate with a minimal damping response during compressive motion, and in rebound motion react with irregular types of damping dependent on load and frequency. Prior art devices have also suffered from a rapidly increasing spring rate as deflection of such a device increases, thereby giving a rough ride to a vehicle containing such devices and incurring high deflection shocks.

The present invention contemplates a new and improved viscous spring damper which exhibits a load supporting capacity and improved operating characteristics over prior viscous spring dampers. The device is wholly contained, simple in design, economical to manufacture, readily adaptable to a plurality of energy dissipation uses, and provides improved shock absorption and energy dissipation.

BRIEF SUMMARY OF THE INVENTION

In accordance with the present invention there is provided a viscous spring damper for damping and leveling structural agitation. The new viscous spring damper is generally comprised of a first outer member including a first fluid chamber and a first elastomeric diaphragm, joined to a connecting member by means of a first elastomeric shear spring; a second outer member including a second fluid chamber and a second elastomeric diaphragm joined to the connecting member by means of a second elastomeric shear spring; and a main fluid chamber in the connecting member communicating with both the first fluid chamber and the second fluid chamber and including restrictive orifice means for restricted flow of fluid whereby relative movement between the members operates to stress the shear springs and the elastomeric diaphragms.

In accordance with another aspect of the invention the connecting member comprises a flexible open-ended conduit including rigid end caps at terminal end portions of the conduit. The end caps are connected to the shear springs.

In accordance with yet another aspect of the present invention, the conduit comprises a plurality of flexible sections interposed between rigid discs which are in fluid sealing engagement with the discs.

In accordance with a further aspect of the invention, each of the flexible sections are configured to comprise an axially extending tube have an integrally formed support strut depending from an outer face of the tube, and a gas chamber interposed between the tube, the strut and one of the discs.

It is a principal object of the present invention to provide an improved viscous spring damper having improved operating characteristics.

It is another object of the invention to provide a wholly, self-contained viscous spring damper having a load supporting capability.

It is yet another object of the invention to provide a viscous spring damper having an elastomeric flexible support column for supporting a static load and having an elastomeric diaphragm segregating a fluid chamber from a gas chamber for absorbing shocks to the load.

Other objects and advantages for the subject new viscous spring damper will become apparent to those skilled in the art upon a reading and understanding of the specification.

BRIEF DESCRIPTION OF THE DRAWINGS

The invention may take physical form in certain parts and arrangement of parts, one and an alternative embodiment of which will be described in detail in the specification and illustrated in the accompanying drawings which form a part hereof and wherein.

DETAILED DESCRIPTION OF THE INVENTION

Figure 1:
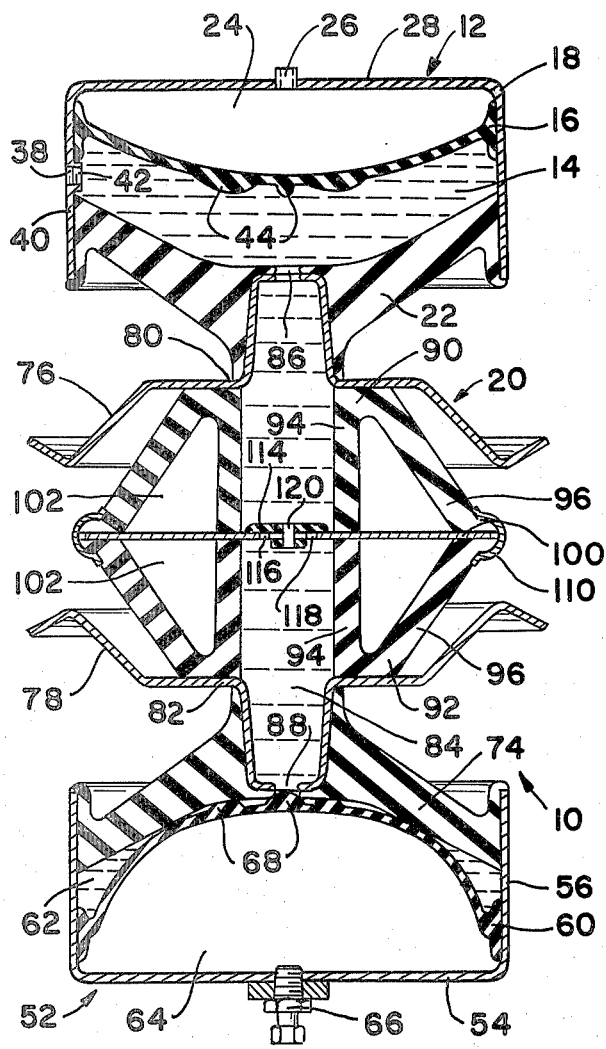
FIG. 1 is a cross-sectional, elevational view of a viscous spring damper constructed in accordance with the present invention in a free state.

Referring now to the drawings wherein the showings are for purposes of illustrating the invention only and not for purposes of limiting the same, the figures show a viscous spring damper 10 for damping and leveling structural agitation. The damper 10 is comprised of a first outer member 12 including a first fluid chamber 14 and a first highly flexible and movable elastomeric diaphragm 16.

First outer member 12 is configured in a generally cup-like form and includes a rigid outer casing 18. The first member 12 is joined to an inner or connecting member 20 with a first elastomeric shear spring 22 which is bonded or connected in a manner for fluid sealing engagement to the peripheral sidewall 40 of the first outer member.

First elastomeric diaphragm 16 separates first fluid chamber 14 from first diaphragm gas chamber 24. Diaphragm 16 has a configuration of the transverse cross-section of the first member 12 and is connected in a manner for fluid sealing to the sidewall 40 of the member 12. Gas chamber 24 is selectively pressurizable through sealable port 26 in the end wall 28 of first outer member 12. Fluid is directed into the first fluid chamber 14 of viscous spring damper 10 through opening 38 in the side wall 40 of first outer member 12. Opening 38 is sealed with a plug means such as plug 42 after the proper amount of fluid has been introduced into the fluid chamber. Wear means in the form of integrally-formed, spaced apart protruding ribs 44 are included on first elastomeric diaphragm 16 for inhibiting the damaging effects of abrasion between the diaphragm 16 and the elastomeric shear spring 22 during operation of the damper. In addition, ribs 44 are spaced so as to prevent an hydraulic lock during abutment of the diaphragm 16 with shear spring 22 and thereby insure fluid passage between the first outer member 12 and the inner or connecting member 20. Reference to a gas in this specification is meant to include any compatible gas, such as air or nitrogen. Reference to a fluid is meant to include any compatible liquid, such as glycol or other hydraulic fluids.

Opposite of first outer member 12 is the second outer member 52. Second outer member 52 is of a similar configuration to first outer member 12 and includes a cup-like configuration having a rigid end wall 54, which is disposed away from connecting member 20, and a side wall 56. A second highly flexible and moveable elastomeric diaphragm 60 is included and segregates a second fluid chamber 62 from the second diaphragm gas chamber 64. Second gas chamber 64 is selectively pressurizable through a valve means such as air check valve 66 in the end wall 54 of the second outer member 52. Diaphragm 60 is also preferably chemically bonded to the side wall 56 of the second outer member to provide a fluid and air tight seal between fluid chamber 62 and gas chamber 64. Second diaphragm 60 also includes wear means such as integrally formed ribs 68 for preventing abrasion damage to the diaphragm and for precluding an hydraulic lock between the second outer member 52 and the connecting member 20. Second outer member 52 is joined to inner or connecting member 20 by means of second elastomeric shear spring 74 which is also preferably chemically bonded to both the sidewall 56 of the second member 52 and the connecting member 20.

Figure 2:
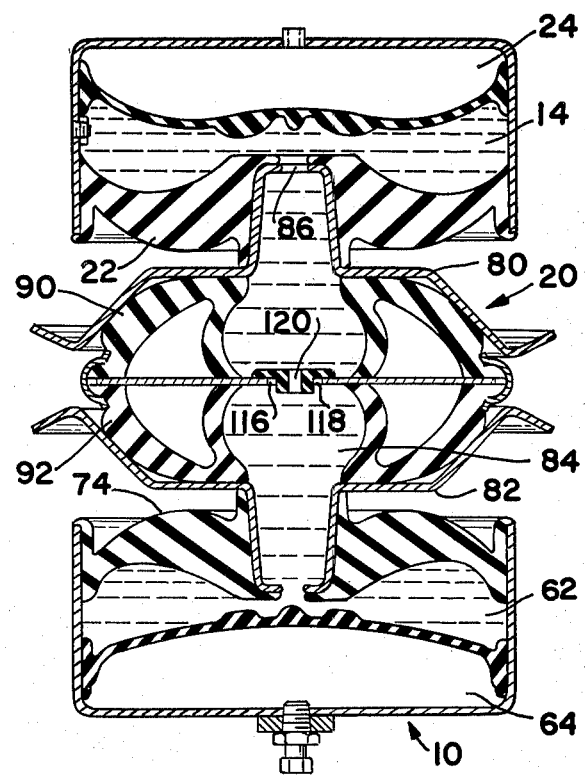
FIG. 2 is a cross-sectional, elevational view showing the spring damper of FIG. 1 in a statically loaded state.
Figure 3:
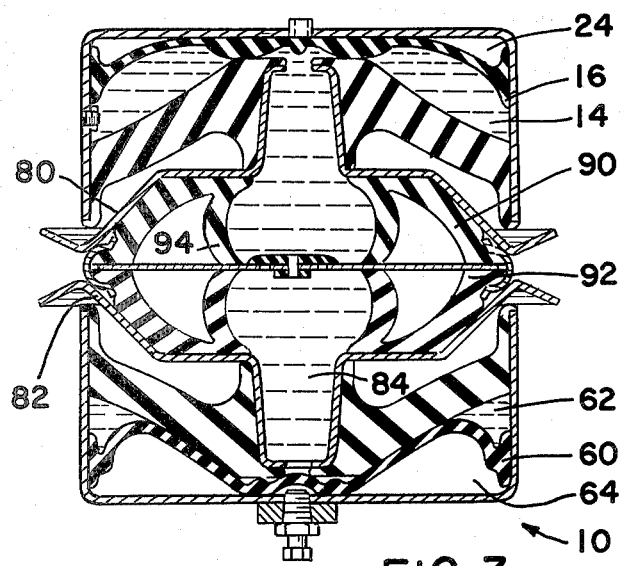
FIG. 3 is a cross-sectional, elevational view of the viscous spring damper of FIG. 1 in a fully compressed state.

With particular attention to FIGS. 1, 2 and 3, one embodiment of the invention is illustrated. Inner or connecting member 20 generally comprises a flexible open-ended conduit including a first end cap 80 and a second end cap 82 at the terminal end portions of inner member 20. End caps 80, 82 are constructed of a strong and durable material similar to the material of the outer casings of the outer members 12, 52. The end caps 80, 82 are connected to the outer members 12, 52 by the elastomeric shear springs 22, 74, respectively. A first circumferential shielding rim 76 is included in first end cap 80 and a second circumferential shielding rim 78 is included in second end cap 82 for receiving and shielding portions of the sidewalls 40, 56 of the outer members, the elastomeric shear springs 22, 74 and the connecting member 20 during operation of the damper. A main fluid chamber 84 is included in inner member 20 and is in fluid communication with the first fluid chamber 14 through first fluid end port 86 in first end cap 80 and the second fluid chamber 62 through second fluid end port 88 in second end cap 82 at the opposed ends of inner member 20.

A plurality of flexible elastomeric sections such as first elastomeric section 90 and second elastomeric section 92 are interposed between end caps 80, 82. Although it is within the scope of the invention to include any number of flexible sections, in the one embodiment illustrated two are preferably employed. Each of the flexible sections 90, 92 are identical in configuration and each comprise a central wall portion or hub 94 having a tube-like configuration and an integrally formed buttress 96 depending from an outer face of the central wall portion 94. The flexible sections 90, 92 are included in inner member 20 in an opposed, facing disposition and are bonded at their outer terminal ends to the end caps 80, 82, respectively, and at their inner terminal ends to a rigid disc 100. Each flexible section includes a gas chamber 102 between the central wall portion 94, the buttress 96 and the rigid disc 100. A circumferentially disposed clamping ring 110 clamps buttresses 96 about disc 100 for further supporting the buttresses.

Restricted orifice means are included in the inner member 20 such as yieldable flap 114 in engagement over fluid ports 116, 118 in rigid disc 100. A central passageway 120 is included in the restricted orifice means and comprises an open-ended fastener which fastens the yieldable flap 114 to the disc 100. It is within the scope of the subject invention to include any number of fluid ports in conjunction with the flap 114.

Figure 4:
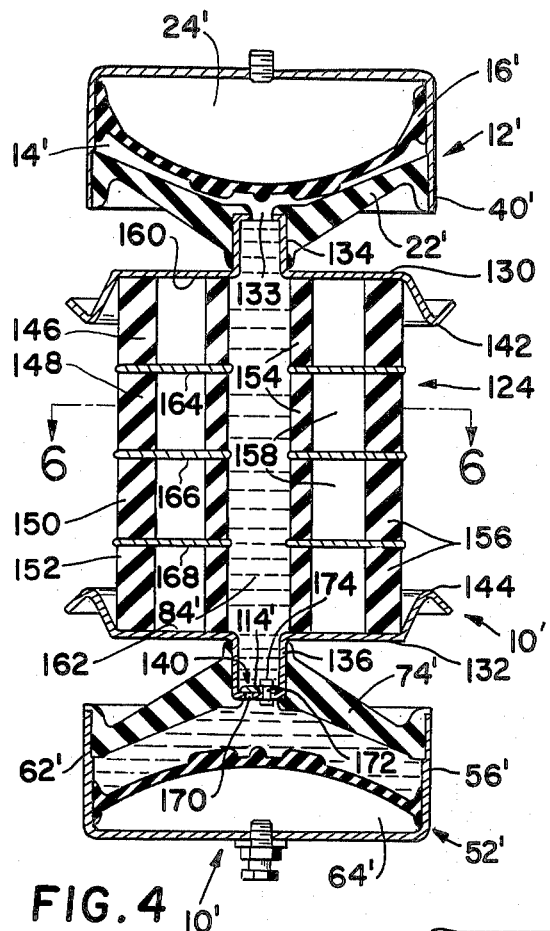
FIG. 4 is a cross-sectional elevational view of an alternative embodiment of a viscous spring damper constructed in accordance with the present invention in a free state.
Figure 6:
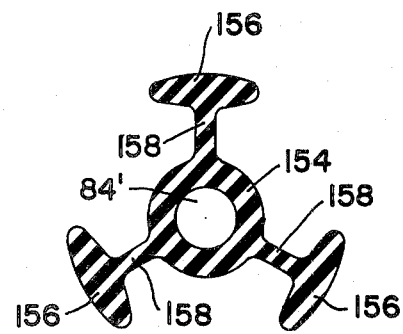
Figure 5:
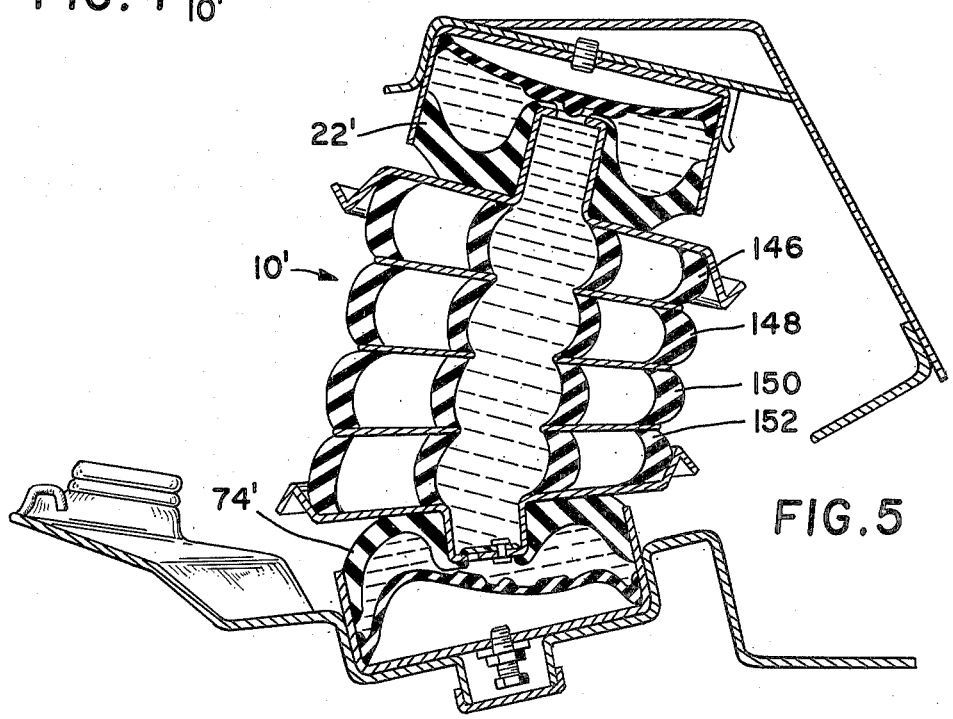
FIG. 5 is a cross-sectional, elevational view of the viscous spring damper of FIG. 4 in a loaded state and during incurrence of a non-axially directed shock; and, FIG. 6 is a cross-sectional view of the connecting member of the invention as shown in FIG. 4 taken along line 6—6 of FIG. 4.

With particular reference to FIGS. 4, 5 and 6, an alternative embodiment of the invention is illustrated. For ease of illustration and appreciation of this alternative, like components are identified by like numerals with primal (′) suffixes and new components are identified by new numerals. Outer members 12′, 52′ are identical in construction and configuration to members 12 and 52 shown in the embodiment hereinbefore disclosed. However, inner or connecting member 124 is an alternative construction and configuration. Connecting member 124 generally comprises an open-ended, flexible conduit or column including a main fluid chamber 84′ in fluid communication with both first fluid chamber 14′ and second fluid chamber 62′. Opposed rigid end caps 130, 132 are of a generally circular configuration and are constructed of a strong durable material. The end caps include centrally located, axially extending flanges 134, 136 and fluid apertures 133, 140 therethrough. Elastomeric shear springs 22′, 74′ are chemically bonded for fluid sealing engagement to the end caps at flanges 134, 136 and thereby operate to connect the outer members 12′ and 52′ to the inner member 124. End caps 130, 132 also include circumferential shielding rims 142, 144 for receiving and shielding portions of the sidewalls 40′, 56′ of the outer members, the elastomeric shear springs 22′, 74′ and the connecting member 124 during operation of the damper 10′. A plurality of identical elastomeric, flexible sections 146, 148, 150, 152 are included in the inner member 124 intermediate the end caps. Although any number of sections could be utilized, four are preferably employed in the alternative embodiment. The flexible sections 146, 148, 150, 152 each comprise a central, open-ended, flexible hub 154 connected to a plurality of identical spaced struts 156 with associated spokes 158 (FIG. 6). The flexible sections 146, 152 adjacent end caps 130, 132 are bonded or chemically sealed at their outer end portions to the inner surfaces 160, 162 of the end caps. Rigid support discs 164, 166, 168 are interposed between the flexible sections and are each chemically bonded thereto on the opposed faces of the discs to provide rigid support to the flexible discs and to seal main fluid chamber 84' against fluid leakage.

Restricted orifice means at aperture 140 comprises a yieldable flap 114' which is disposed adjacent flange 136 of end cap 132. Flap 114' is fastened in a manner as hereinbefore disclosed to end cap 132. A fluid port 170 is provided in end cap 132 for a passage of fluid around yieldable flap 114' in a single direction during operation of the damper. A central fluid passageway 172 in flap fastener 174 provides for fluid flow in both directions between the main fluid chamber 84' and the second fluid chamber 62'.

Although only one and an alternative embodiment of the invention have been illustrated, it is within the scope of the invention to include inner or connecting members comprising a flexible tube-like conduit other than one having a generally cylindrical main fluid chamber or the flexible section configurations herein illustrated.

OPERATION

With particular attention to FIGS. 1, 2 and 3, the improved operation of one embodiment of the present invention is illustrated. FIG. 1 shows a flexible column viscous spring damper 10 in an unloaded free state. Second gas chamber 64 is highly pressurized for near maximum expansion of second elastomeric diaphragm 60. Second fluid chamber 62 therefore includes a minimum amount of fluid. The flexible sections 90, 92 of the connecting member 20 and the elastomeric shear springs 22, 74 are all in a non-stress equilibrium state.

FIG. 2 illustrates the invention of FIG. 1 upon receiving a static load such as in an installed state upon a vehicle. The load operates to compress the damper 10 thereby stressing elastomeric shear springs 22, 74 and flexible sections 90, 92. Due to the compressive force of the load, and the telescoping of the damper 10, first fluid chamber 14 incurs a reduction in volume thereby further pressurizing first diaphragm gas chamber 24 and forcing fluid from first fluid chamber 14 into the main fluid chamber through first fluid end port 86 and through central passageway 120. Fluid also passes from the main fluid chamber 84 into second fluid chamber 62 to further pressurize second gas chamber 64. The flow of fluid through the ports as well as through the tube-like main fluid chamber exhibits a damping response to the load force, to inhibit the rebound spring oscillations that the shear springs 22, 74 and the diaphragms 16, 60 tend to produce upon deflection. It can be seen that all fluid chambers, and inner and outer member gas chambers are thus further pressurized by the applied load. In addition, the applied static load is primarly supported by distribution of load forces through stressing of elastomeric shear springs 22, 74 and flexible sections 90, 92. As flexible sections 90, 92 buckle from an axial loading force they compress in an axial direction and deflect in a radial direction. However, the sections are supported by end caps 80, 82 which generally conform to the outer surfaces of the flexible sections during deflection. In response to a static load, the elastomeric shear springs 22, 74 and the flexible sections 90, 92 operate in combination to give a characteristic spring rate to the invention.

With particular attention to FIG. 3, the operation of the invention of FIG. 1 is illustrated upon receiving a compressive jounce force in addition to the static load. The damper is substantially fully telescoped inwardly for a maximum reduction in volume space of the diaphragm gas chambers 24, 64 and the outer member fluid chambers 14, 62. The elastomeric diaphragms 16, 60 are fully stressed and flexible sections 90, 92 are deflected for close engagement to the inner surfaces of the rigid end caps 80, 82. The central wall portion or hub 94 of the flexible sections 90, 92 is deflected radially outwardly for accommodating a maximum amount of fluid in the main fluid chamber 84 under such a highly compressed state of the damper 10.

A static load on the subject invention is supported by increased pressurization of the gas chambers and the deflection and stressing of the flexible sections 90, 92 and the shear springs 22, 74. The oscillating shocks inflicted upon the damper during typical operation (e.g. low frequency) as when the invention is installed upon a moving vehicle, are absorbed by further deflection of the elastomeric shear springs and flexible sections, as well as increased pressurization of the gas chambers. Such shocks are dampened through the restricted flow of fluid through the restricted orifice fluid ports and the main fluid chamber which operate to limit the rate of fluid flow. This absorbs shock and dissipates energy in a known manner.

With particular attention to FIGS. 4 and 5, the operation of the alternative embodiment of the invention is illustrated. FIG. 4 illustrates the alternative embodiment in a free unloaded state where both elastomeric shear springs 22', 74' and flexible sections 146, 148, 150, 152 are neither stressed nor deflected. In this embodiment, the first diaphragm gas chamber is pressurized for maximum expansion of diaphragm 16'. It is within the scope of the invention to selectively pressurize either first diaphragm gas chamber 24' or second diaphragm gas chamber 64' to any predetermined pressure that is desired for operation of the damper 10'. In addition, upon installation in a vehicle, the gas chambers may be further pressurized to level the vehicle to a selected position.

FIG. 5 illustrates the alternative embodiment of the invention in a typical vehicle installation upon receiving a deflecting force having an axial and a radial component thereby both compressing and deflecting the damper 10' into a nonaligned disposition. Such forces are typical of shocks incurred on an axle of a moving vehicle. It is a particular feature of the invention that the flexible sections 146, 148, 150, 152 and the elastomeric shear springs 22', 74' are each capable of variable deflection about a radial plane of the damper 10' while maintaining load support.

The subject invention is wholly self-contained and can be used as a complete vehicle suspension. It possesses a load capacity and the means to support and deflect a load to a preselected level position, while absorbing shocks to the load. It exhibits a variable spring rate and damping response in both compression and expansion and provides a relatively low spring rate to jounce shocks with a high damping response to provide a softer ride to a vehicle than those including known suspension systems.

The invention has been described with reference to one and an alternative embodiment. Obviously, modifications and alterations will occur to others upon a reading and understanding of the specification. It is our intention to include all such modifications and alterations insofar as they come within the scope of the pending claims or the equivalents thereof.

Having thus described the invention we now claim:

1. A viscous spring damper for damping and leveling low frequency structural agitation in a device comprising:
   a first outer member fixedly attached to said device joined to a connecting member by means of a first elastomeric shear spring, said first outer member including a first fluid chamber and a first highly flexible and moveable elastomeric diaphragm;
   a second outer member fixedly attached to said device and moveable independently from said first outer member joined to said connecting member by means of a second elastomeric shear spring, said second outer member including a second fluid chamber and a second highly flexible and moveable elastomeric diaphragm;
   said connecting member including an open-end conduit having at least one flexible section with rigid end caps at terminal ends, said end caps being connected to said shear springs;
   at least one of said outer members includes means for selective gas pressurization of at least one of said elastomeric diaphragms whereby said viscous spring damper is adapted to level a load supported thereby by pressurization of said diaphragm; and
   a main fluid chamber in said connecting member communicating with said first fluid chamber and said second fluid chamber, and including restrictive orifice means for restricted flow of fluid whereby relative movement between said members operates to stress said shear springs and said elastomeric diaphragms and vary the overall volume of said chambers.

2. The viscous spring damper of claim 1 wherein said conduit comprises a plurality of flexible sections interposed between rigid discs, said flexible sections sealingly engaging said discs.

3. The viscous spring damper of claim 2 wherein said flexible sections are configured to comprise an axially extending tube having a plurality of spaced struts, spaced radially outwardly from said tube and connected to said tube with associated spokes.

4. The viscous spring damper of claim 2 wherein said flexible sections are configured to comprise an axially-extending tube having an integrally formed buttress depending from an outer face of said tube, and a gas chamber interposed between said tube, said buttress, and one of said discs.

5. The viscous spring damper of claim 4 wherein said end caps are configured to closely receive outer surfaces of said buttresses and said shear spring upon telescopic movement of said viscous spring damper.

6. The viscous spring damper of claim 4 wherein a clamping ring clamps contiguous pairs of said flexible sections about said rigid discs.

* * * * *